Dec. 1, 1931.   J. M. HALL   1,834,098
SLACK ADJUSTER FOR RAILWAY CAR BRAKES
Original Filed Nov. 14, 1928    2 Sheets-Sheet 1
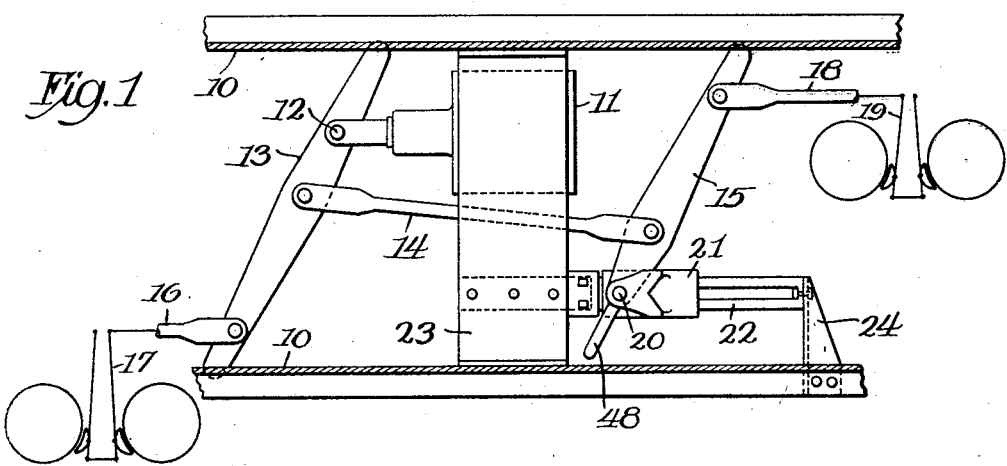

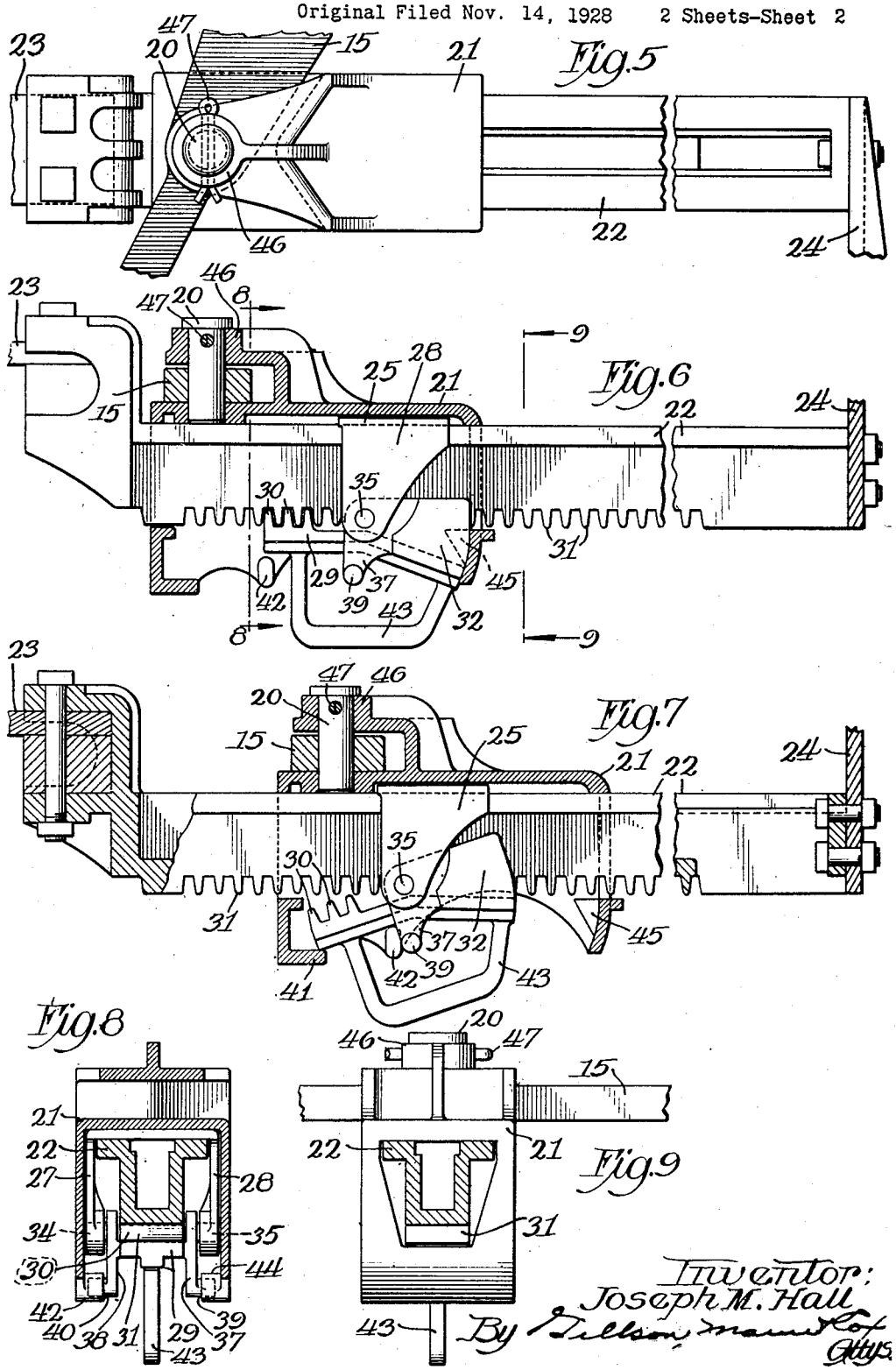

Patented Dec. 1, 1931

1,834,098

UNITED STATES PATENT OFFICE

JOSEPH M. HALL, OF CHICAGO, ILLINOIS, ASSIGNOR TO UNIVERSAL DRAFT GEAR ATTACHMENT CO., A CORPORATION OF ILLINOIS

SLACK ADJUSTER FOR RAILWAY CAR BRAKES

Application filed November 14, 1928, Serial No. 319,354. Renewed February 27, 1931.

The invention relates to that type of slack adjusters by means of which a pivot of the dead cylinder lever is shifted to take up slack due to wear of the brake shoes and other parts of the brake gear to provide for the full application of the brakes with normal movement of the piston of the air cylinder.

A preferred embodiment of the invention is illustrated and described, but it may take other forms within the scope of the appended claims.

In the accompanying drawings

Fig. 1 is a detail plan partly in section of the framing of a car and the foundation brake mechanism, some parts of the latter being shown diagrammatically;

Fig. 2 is a view in perspective, some parts being broken away, of the element of the adjusting mechanism to which the dead cylinder lever is pivoted;

Figs. 3 and 4 are views in perspective of other elements of the adjusting mechanism;

Fig. 5 is a detail plan view of the adjuster in service position;

Fig. 6 is a longitudinal view of the same, partly in section;

Fig. 7 is a similar view, the parts being shown in a position assumed during the adjusting operation.

Figs. 8 and 9 are sectional views on the lines 8—8 and 9—9, respectively, of Fig. 6.

A pair of car sills is shown at 10, 10. At 11, there is represented conventionally, a brake cylinder, the piston rod of which is attached as indicated at 12 to the live cylinder lever 13 which is connected by means of the pull rod 14 with the dead cylinder lever 15. The lever 13 is also connected by a pull rod 16 with the live brake lever 17 and the lever 15 is similarly connected by the rod 18 with a live brake lever 19. All of these parts and their arrangement are of conventional form.

The dead cylinder lever 15 is pivoted as shown at 20 to a travelling fulcrum element 21 slidably mounted upon a fixed rack bar 22 attached to the framing of the car, as shown its forward end being secured to a cross plate 23 connecting the sills 10, 10 and its rearward end to a bracket 24 secured to one of the sills. The element 21 is a box-like structure, open at its bottom and perforated at its ends in order that it may be sleeved upon the rack bar.

A U-shaped saddle 25 is slidably seated upon the rack bar, within the element 21, the top wall of which is recessed to accommodate it and to permit relative movement of the two parts.

The legs 27, 28 of the saddle extend below the rack bar and carry a pawl, in the form of a plate 29, provided on its upper face with a plurality of teeth 30 for cooperating with the rack teeth 31 formed on the lower face of the bar 22. The teeth are normally held in engagement by a counterweight 32 formed on the rear end of the plate slotted to straddle the bar 22. A pair of trunnions 34, 35 project laterally from the forward end of the counterweight and engage within eyes 36, 36 in the lower ends of the saddle legs 27, 28, the latter being sufficiently flexible to permit the necessary spreading in assembling. A pair of legs 37, 38 extend downwardly from the plate 29, forward of the counterweight, each carrying a laterally projecting lug 39, 40 positioned, as shown, forward of the trunnions 34, 35 and being engageable by tappets 42, 44 projecting inwardly from the side walls of the element 21.

A loop 43 depends from the plate 29 and constitutes a handle by means of which the teeth 30 may be manually disengaged from the teeth 31. The rearward end of the plate 29 inclines downwardly and is engaged by an instanding lug 45 formed on the rear wall of the element 21 when the saddle is in its rearwardmost position relatively to this element, (the counterweight being recessed for the accommodation of the lug), thereby locking the pawl to the rack. An overhanging jaw 46 formed on the top wall of the element 21 provides an upper bearing for the pivot pin 20 and the latter is prevented from accidental displacement by a cotter pin 47 setting laterally through it and the jaw.

Brake application force urges the pivotal end of the lever 15 to the left and is resisted by teeth 30, 31, being transmitted thereto by the rear end wall of the element 21 in engagement with the counterweight 32. When by reason of wear in the brake system, more than normal brake slack is developed and thereby the travel of the brake cylinder piston is increased, the excessive slack may be taken up by manually swinging the pivoted end of the lever to the right, the lever being preferably provided with a grip member 48, a sufficient distance to bring the brake shoes in contact with the car wheels.

The element 21 moves backwardly with the lever independently of the saddle 25 until the lugs 42, 44 come into engagement with the lugs 39, 40. Upon the installation of new shoes, the pawl and the element 21 are relatively positioned, as shown in Fig. 6, their rearward ends being in engagement, and the lugs 42, 44 are spaced from the lugs 39, 40 a distance corresponding to normal brake clearance. In the readjusting operation, the element 21 moves backwardly with the lever 15 and when such lever movement has advanced the shoes a distance corresponding with normal slack, the pawl is tilted downwardly, as shown in Fig. 7, by the engagement of the lugs 42, 44 with the lugs 39, 40. The movement of the lever 15 is continued until the shoes make contact with the wheels and during this movement, the pawl is carried backwardly with the element 21, the forward end of the recess in this element coming into engagement with the saddle 25 at the instant of the release of the pawl.

The lever 15 being now released will swing forwardly either by the normal receding movement of the brakes or by the next brake application. The element 21 will move forwardly with the lever until arrested by the engagement of its rear end with the counterweight, whereupon it and the lever pivot will be arrested as the saddle will have been again engaged with the rack bar as soon as the lugs 42, 44 shall have moved out of contact with the lugs 39, 40. When the element 21 has resumed its normal position as illustrated in Fig. 6, the excess slack will have been eliminated.

The front wall of the element 21 may be provided at its lower end with a backwardly projecting lug 41 for arresting downward movement of the plate 29 and preventing friction between its rear end and the rack bar teeth in backward movement.

The teeth of both the rack bar and pawl plate are preferably of the gear instead of the ratchet type, and prevent movement of the pawl in both directions. When the pawl is disengaged from the rack bar manually, the element 21 is moved back slightly by the cam action of the lug 45, the lower face of which is beveled to facilitate the release.

While the embodiment of the invention as described is highly efficient, other forms will come within its scope.

I claim as my invention:

1. A slack adjuster for car brake systems comprising a rack bar, an element slidably mounted on the bar, means for pivotally attaching a lever of the brake system to such element, a saddle slidably mounted on the bar and having a limited range of movement thereon relatively to the first named slidable element, a toothed element pivotally carried by the saddle and cooperating and normally in engagement with the teeth of the rack bar, and a trip carried by the first named slidable element for disengaging the toothed element from the rack bar teeth.

2. A slack adjuster for car brake systems comprising a fixed toothed bar, a saddle slidably mounted on the bar and provided with a pawl normally engaging the teeth thereof, a rider slidably mounted on the bar and overlapping the saddle and having limited movement relatively thereto, a trip carried by the rider for disengaging the pawl and for shifting the saddle on the bar when moving in one direction, the rider positively abutting the pawl in the opposite direction, and means for pivoting a lever of the system on the rider.

3. A slack adjuster for car brake systems comprising a fixed bar having teeth on its lower face, a U-shaped saddle slidably mounted astride the bar and provided with a pawl normally engaging the bar teeth, a rider slidably mounted on the bar and having stops for fore and aft engagement with the saddle and spaced to permit limited movement relative thereto, a trip carried by the rider for disengaging the pawl in one direction of movement and means for pivoting a lever of the system on the rider.

4. A slack adjuster for car brake systems comprising a fixed bar having teeth on its lower face, a U-shaped saddle slidably mounted astride the bar and provided with a pawl normally engaging the bar teeth, a rider slidably mounted on the bar and having an abutment bearing on the pawl in one direction, a trip carried by the rider for disengaging the pawl in the opposite direction of movement when the rider has been moved a distance corresponding with normal brake slack.

5. A slack adjuster for car brake systems comprising a fixed rack bar having gear teeth on its lower face, a fulcrum element for a brake lever riding on the bar, a saddle within such element and movably relatively thereto, a counterweighted pawl pivotally carried by the saddle and having gear teeth for engaging the rack bar teeth, a trip carried by the fulcrum element for disengaging the pawl upon backward movement a distance corresponding with normal brake travel, and an abutment at the rear end of the fulcrum element for engaging the pawl in service position of the parts.

6. A slack adjuster for car brake systems comprising a fixed bar having teeth on its lower face, a U-shaped saddle slidably mounted astride the bar and provided with a pawl normally engaging the bar teeth, a rider slidably mounted on the bar and having stops for fore and aft engagement with the saddle and spaced to permit limited movement relative thereto, a trip carried by the rider for disengaging the pawl in one direction of movement, means carried by the rider for locking the pawl against disengagement on movement in the opposite direction, and means for pivoting a lever of the system on the rider.

7. A slack adjuster for car brake systems comprising a fixed bar having teeth on its under face, a U-shaped saddle slidably mounted on the bar, a toothed plate pivoted to the legs of the saddle, a counterweight attached to the plate for normally engaging its teeth with the bar teeth, a rider slidably mounted on the bar and overlapping the saddle and having limited movement relative thereto, a trip carried by the rider for disengaging its teeth from the bar teeth, and having an abutment for engaging the counterweight when the rider moves in the opposite direction, and means for pivoting a lever of the system on the rider.

8. A slack adjuster for car brake systems comprising a fixed bar having teeth on its under face, a U-shaped saddle slidably mounted on the bar, a toothed plate pivoted to the legs of the saddle, a counterweight attached to the plate for normally engaging its teeth with the bar teeth, a rider slidably mounted on the bar and overlapping the saddle and having limited movement relative thereto, a trip carried by the rider for disengaging the plate teeth from the bar teeth, and having an abutment for engaging the counterweight and for locking the plate in engagement with the bar teeth when the rider moves in the opposite direction, and means for pivoting a lever of the system on the rider.

9. A slack adjuster for car brake systems comprising a fixed element having a longitudinal series of teeth, a pawl carried by and having limited longitudinal movement relatively to the fixed element and being normally in engagement with the teeth thereof, a movable element in slidable engagement with the fixed element, the movable element being provided with means for abutting and locking the pawl in one direction and for disengaging and shifting the pawl in the other direction, and a brake lever pivot carried by the movable element.

10. A slack adjuster for car brake systems comprising a fixed element having a longitudinal series of teeth, a movable element in slidable engagement with the fixed element, a pawl carried by and having limited longitudinal movement relative to the movable element and being normally in engagement with the teeth of the fixed element, the movable element being provided with means for locking the pawl in one direction and for disengaging and shifting the pawl in the other direction, and a brake lever carried by the movable element.

In testimony whereof I affix my signature.

JOSEPH M. HALL.